(12) United States Patent
Kennedy et al.

(10) Patent No.: US 10,810,466 B2
(45) Date of Patent: Oct. 20, 2020

(54) METHOD FOR LOCATION INFERENCE FROM MAP IMAGES

(71) Applicant: FUJI XEROX CO., LTD., Minato-ku, Tokyo (JP)

(72) Inventors: Lyndon Kennedy, San Francisco, CA (US); Matthew L. Cooper, San Francisco, CA (US); David Ayman Shamma, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 161 days.

(21) Appl. No.: 16/111,065

(22) Filed: Aug. 23, 2018

(65) Prior Publication Data
US 2020/0065629 A1 Feb. 27, 2020

(51) Int. Cl.
*G06K 9/62* (2006.01)

(52) U.S. Cl.
CPC ......... *G06K 9/6262* (2013.01); *G06K 9/6215* (2013.01); *G06K 9/6232* (2013.01)

(58) Field of Classification Search
CPC ... G06K 9/6262; G06K 9/6232; G06K 9/6215
See application file for complete search history.

(56) References Cited

U.S. PATENT DOCUMENTS

| | | | | |
|---|---|---|---|---|
| 2003/0227469 A1* | 12/2003 | Kamikawa | ......... | G01C 21/3647 345/629 |
| 2011/0007962 A1* | 1/2011 | Johnson | ................... | G06F 16/70 382/154 |
| 2015/0125044 A1* | 5/2015 | Rudin | ....................... | G01S 5/16 382/106 |
| 2019/0220676 A1* | 7/2019 | Miyatani | ................... | G06T 7/73 |
| 2019/0303725 A1* | 10/2019 | Gurvich | .............. | G06K 9/6232 |

OTHER PUBLICATIONS

Nam N. Vo and James Hays Localizing and Orienting Street Views Using Overhead Imagery Computer Vision and Pattern Recognition, Mar. 22, 2017. 24 pages (Year: 2017).*
Raia Hadsell, Sumit Chopra, Yann LeCun "Dimensionality Reduction by Learning an Invariant Mapping" Computer Vision and Pattern Recognition (CVPR), Conference on. 2006. 8 pages (Year: 2006).*
Bromley, J. et al., "Signature Verification using a "Siamese" Time Delay Neural Network" In Advances in Neural Information Processing Systems, 1994, 8 pages.
(Continued)

*Primary Examiner* — Minjung Kim
(74) *Attorney, Agent, or Firm* — Procopio, Cory, Hargreaves & Savitch LLP

(57) ABSTRACT

A computer implemented method of associating a non-electronic map with an electronic map is provided. The method comprises, for an obtained online data collection, generating a database of style-invariant and location-variant map representations by application of a convolutional neural network. Additionally, for a captured image associated with the non-electronic map, the captured image not having geo-location metadata, the method comprises applying a nearest neighbor heuristic to compare the captured image to the map representations and generate a match between the captured image and the map representations, and performing a display action associated with the match.

17 Claims, 8 Drawing Sheets
(5 of 8 Drawing Sheet(s) Filed in Color)

(56) References Cited

OTHER PUBLICATIONS

Hadsell, R. et al. "Dimensionality Reduction by Learning an Invariant Mapping" In Computer Vision and Pattern Recognition, 2006 IEEE Computer Society Conference, Nov. 2005, 8 pages.
Kalantidis, Y. "Locally Optimized Product Quantization for Approximate Nearest Neighbor Search" In Proceedings of the IEEE Conference on Computer Vision and Pattern Recognition, 2014, 8 pages.
Li, X. et al., "Learning Social Tag Relevance by Neighbor Voting" IEEE Transactions on Multimedia, Nov. 2009, 14 pages, vol. 11, No. 7.
Mohedano, R. et al., "Camera Localization Using Trajectories and Maps" IEEE Transactions on Pattern Analysis and Machine Intelligence, 2014, 14 pages, vol. 36 No. 4.
Hays, J. "IM2GPS: estimating geographic information from a single image", In Computer Vision and Pattern Recognition, 2008, 8 pages.
Kennedy, L. et al., "How Flickr Helps us Make Sense of the World: Context and Content in Community Contributed Media Collections" In Proceedings of the 15th ACM International Conference on Multimedia, 2007, 10 pages.
Choi, J., et al. "The Placing Task: A Large-Scale Geo-Estimation Challenge for Social-Media Videos and Images" In Proceedings of the 3rd ACM Multimedia Workshop on Geotagging and Its Applications in Multimedia, 2014, 5 pages.

* cited by examiner

100

101

METHOD FOR LOCATION INFERENCE FROM MAP IMAGES

BACKGROUND

Field

Aspects of the example implementations relate to methods, systems, and interfaces for capturing an image of a physical map, and extracting the geolocation information of that map by use of convolutional neural networks and a nearest neighbor algorithm.

Related Art

In the related art, one or more users may encounter images or other visual data that is intended to communicate real-world information. Such images or other visual data may include, but is not limited to, timetables, menus, figures and graphs. As a specific example, maps are informational visualizations that one or more users may experience. For example, but not by way of limitation, a map may display a representation of a surrounding geographical area associated with the user at a physical location, such as a map that is provided at a user who arrives at a train station. Similarly, the maps may be included as additional information received by the user, such as within reservation confirmation or receipts.

While maps that are physically displayed or printed may assist one or more users in orienting themselves to a new location, those maps may be affixed to signage permanently or otherwise in a form that is only physical. As a result, the one or more users cannot capture the relevant information on the map, and then take that information with them as they physically move away from the map. For example, FIG. 1(a) illustrates a related art map 100 that is printed (e.g., from a public display). In this case, the map is a tourist information map on a physical sign with a reflective coating. Because the map is a physical object, it does not include any indicators such as metadata.

On the other hand, the one or more users would typically navigate physically using maps, and directions that are interactively displayed on electronic communication devices, such as personal mobile smart devices. For example, FIG. 1(b) illustrates a related art map 101 that is native to an online mobile application, such as a cell phone map (e.g., having a pin drop marking "you are here" in the local language), covering a similar region to the physical map 100 of FIG. 1(a). However, the map 100 does not have any metadata and is only a physical map.

Thus, map 100 is not electronically associated with map 101. Further, a brute force approach to manually obtain and compare various electronic maps to determine a closest match in an automated real-time manner is not available.

Accordingly, in the related art, there is an unmet need with respect to approaches to extract information from physical maps that are stationary or printed, and that report back information to online mobile applications.

SUMMARY

Aspects of the example implementations include A computer implemented method of associating a non-electronic map with an electronic map, the method comprising: for an obtained online data collection, generating a database of style-invariant and location-variant map representations by application of a convolutional neural network; for a captured image associated with the non-electronic map, the captured image not having geo-location metadata, applying a nearest neighbor heuristic to compare the captured image to the map representations and generate a match between the captured image and the map representations; and performing a display action associated with the match.

Additional aspects of the example implementations include the display action comprising providing an overlay of the match of the map representations and the captured image.

Further aspects of the example implementations include the convolutional neural network comprising a deep siamese convolutional neural network with a plurality of subnetworks each having identical convolutions and weights, an output of the final layer of each of the subnetworks is subject to contrastive loss comparison, and the weights are updated based on a result of the contrastive loss comparison. Each of the subnetworks may receive respective ones of the map representations as inputs, and comprises a plurality of successive convolutional layers in sequence, followed by one or more fully connected layers that provide outputs to the contrastive loss comparison.

Other aspects of the example implementations include the nearest neighbor heuristic comprising, for the captured image as a query, applying the nearest neighbor heuristic to the database indexed by locally optimized product quantization (LOPQ), to obtain a prescribed number of nearest matches, reorder the nearest matches based on true distance, and provide suggested GPS coordinates for the image.

Aspects of the example implementations also include the style-invariant map representations comprising at least one of color choice and rendering style, and the location-variant representation is associated with a GPS coordinate.

Further, aspects of the example implementations include the non-electronic map and/or the electronic map comprising one or more images from a video.

Also provided is a non-transitory computer readable medium including a processor configured to execute instructions stored in a storage, an image capture device configured to capture one or more images, and generate media objects, and the image capture device including a processor and storage.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
FIGS. 1(a) and (b) illustrate related art physical and cell phone maps, respectively.
Figure 1B:

The following detailed description provides further details of the figures and example implementations of the present application. Reference numerals and descriptions of redundant elements between figures are omitted for clarity. Terms used throughout the description are provided as examples and are not intended to be limiting. For example, but not by way of limitation, the term "map tile" as used herein may refer to a geographic tile associated with geographical locational indicators, such as a latitude/longitude combination.

Aspects of the example implementations are directed to a method for extracting geolocation information associated with physically displayed maps that do not have metadata, images of which have been captured via camera or other digital structure. For example, but not by way of limitation, for a map image associated with a real world map, that was captured through a camera, the example implementation localizes the map image within the world, and representation from the database has been determined, returns a global positioning system (GPS) coordinate. Optionally, annotations from the original physical map that work captured in the image of the physical map may be added to the closest match provided from the database. Also optionally, coarse geographic information (e.g., recent geographic information at a broader scale than the coordinate, such as city or regional scale) may also be used to provide an initial (e.g., coarse) filter to provide an initial narrowing of the search space. The GPS coordinate can then be used within smart devices for mapping and navigation.

To implement the example approach, a task associated with the method includes a large-scale, content-based image retrieval. In operation, a large collection of map images with known geographic coordinates is gathered. For a query image provided by the user, associated with the physical map and not having any metadata, a closest match between the image of the real world map and the collection of map images is identified from the database. For example, but not by way of limitation, the database may be sourced from open-source, freely available databases. As a result, geocoordinates of the matched image are returned in response to the query. As noted above, a broader-level filter based on recent geographical information (e.g., recent city-level geographical information) may also be used to limit the collection of map images from the database.

According to the example implementation, a deep siamese convolutional neural network is trained on training data (e.g., gathered training data), to learn and embedding, so as to capture the location semantics of map imagery across various different styles of rendering.

For example but not by way of limitation, the gathered training data may be applied to learn representations that keep map tiles depicting the same location close in the feature space, regardless of the style in which the maps are rendered. Further, indexing and retrieval across the large collection may be performed by use of an algorithm, such as approximate nearest neighbor. However, other heuristics or searches may be substituted for the nearest neighbor algorithm.

The learned embedding is applied as a feature space for conducting a similarity search across the collection of map images. For example, but not by way of limitation, coarse geographical information (e.g., recent geographical information at a region or city level) may be used to accelerate the search, by narrowing the search space to be considered.

The geographic information associated with the example implementation may be applied by the user for navigation, that the invention is not limited thereto. For example, but not by way of limitation, other uses of the map may be employed, as would be known to those skilled in the art.

To perform the large-scale, content-based image retrieval, the information extraction may be performed according to several key components, so as to deliver automatic localization from the acquired map images associated with a physical map not having metadata. These components include, but are not limited to, a large database having geo-reference to map images, a method for creating map representations that are invariant against map styles (e.g., agnostic with respect to the style of the map) while still being able to capture locational semantics, and a method for conducting nearest neighbor search across large collections of high dimensional feature vectors. As explained above, the search may be bounded or limited based on recent geographical information at the city level, so as to accelerate the search.

Figure 2:
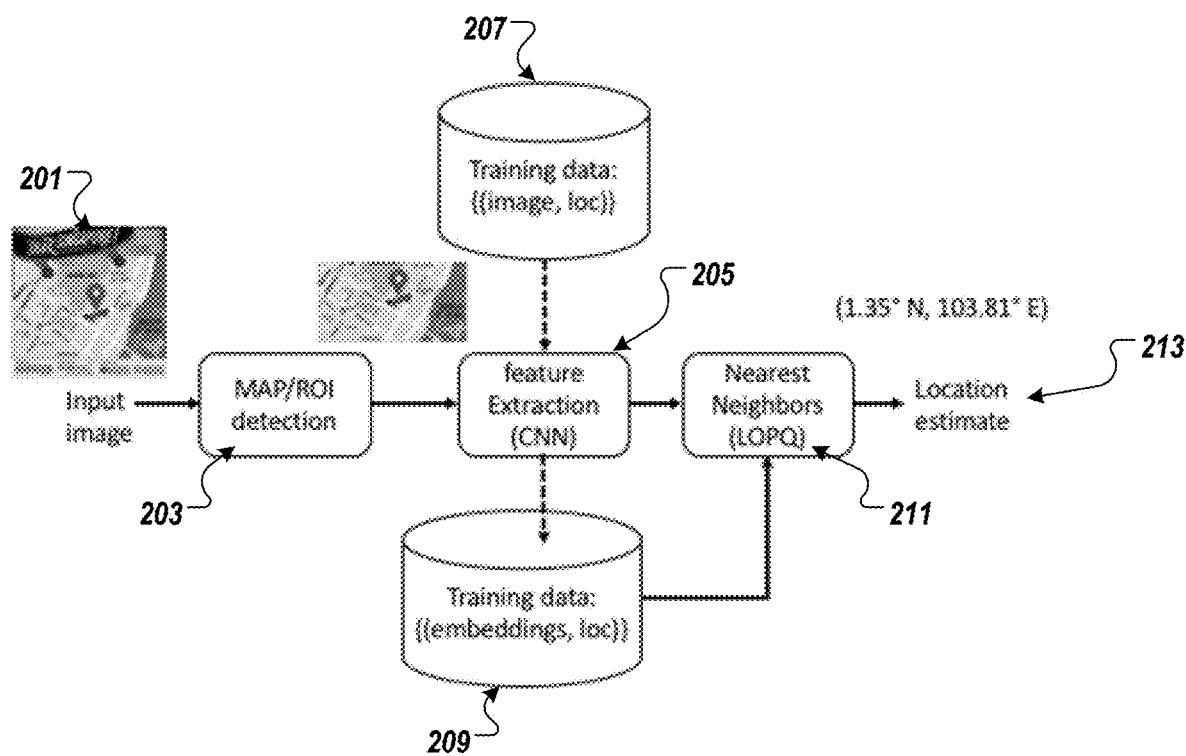
FIG. 2 illustrates a data flow for location inference according to an example implementation.

FIG. 2 illustrates a data flow 200 according to the example implementations, associated with a method of location inference. In the drawing, the dashed arrows are indicative of off-line processing, and the solid arrows are indicative of processing that is performed at test time (e.g., operation time for the large database generation).

According to the dataflow, an input image 201 is first segmented, so as to detect the map subregion. Accordingly, at 203, detection of the region of interest (ROI) on the map is performed. At 205, the detected subregion is input for feature extraction. The subregion may be input to either of the CNN subnetworks in the siamese network, to extract its feature representation. Due to the high degree of variability in image data, it may be necessary to emphasize certain features, while having invariance for other features. By the application of a set of training data based on an association between image and location at 207, the feature extraction 205 may generate training data having an association between embedded information and location at 209, as part of an off-line (e.g., non-real time) process.

Upon completion of feature extraction at 205, a nearest neighbor heuristic or algorithm is applied at 211, to identify the most similar training instance in the database, by also using training data 209, which includes information associating embedded information with the location. Accordingly, the corresponding location is returned at 213 as the final estimate.

Optionally, the nearest neighbor algorithm 211, using models such as LOPQ (Locally Optimized Product Quantization), may return a distance in feature space, which can be characterized as a confidence measure that has been thresholded to disallow responses in low confidence scenarios. Similarly, the database may include map tiles from a plurality of sources that represent the same location. A voting approach may be applied to reconcile different locations that are represented in a top-return set of results. As explained above, the dashed arrows are indicative of features for the training data that can be extracted off-line following the network training, whereas the solid arrows are indicative of processing that is performed at test time, such as in real time, but not limited thereto.

According to the example limitations, metadata may be created around physical objects of the input image that was provided at 201. Further, links may be provided to existing files with the metadata.

As shown above in 205, the deep siamese convolutional neural network is directed to learning a feature space embedding of map images, which reflects the semantics of maps, and important cues that can be used to compare maps across a plurality of rendering styles for the maps. In siamese neural networks, training instances are presented as pairs. The pairs are specified as either being dissimilar or similar, according to ground truth labeling. Each image in each pair is then passed through twin subnetworks that are identical in both structures and weighting parameters.

The representations that are output at the end of each network are compared, using, for example but not by way of limitation, a contrastive loss function. The contrastive loss function rewards Euclidean proximity between ground truth similar pairs, while penalizing close pairs of ground truth dissimilar exemplars. An objective of the comparison is for the neural network to learn a representation that both captures location-based similarity between images, and is invariant to color choices, rendering styles or other presentational aspects that are substantially unrelated to the actual location being depicted.

In the forgoing example implementations, the raw input image is may be collected from multiple sources. For example, according to one nonlimiting example implementation, raw input images are obtained from OpenStreetMap and Stamen, having a size of 256×256 pixels. In order to gather the data, a query is performed for a bounding box associated with a target physical geolocation, such as a target city. Then, all of the corresponding map tile images are downloaded for each city. As explained above, the search space may be narrowed by applying coarse geographic information (e.g., city-level recent geographic information), to narrow the search space.

Each map tile may have a specific URL that is of the form /z/x/y.png where z is the current zoom level, $lon=x/z^2 \cdot 360-180$, and $lat=\arctan(\sin h(\pi-y/2^z)) \cdot 180/\pi$. Accordingly, for a given title URL, the lon/lat bounding box of that tile can be calculated. Further, the data set may be augmented with various other renderings of the locations, such as those that may be provided by Stamen Design, for example. The foregoing renderings use the same underlying geospatial information from OpenStreetMap, but they render map images that appear entirely different.

Figures 3A, 3B, 3C, 3D:
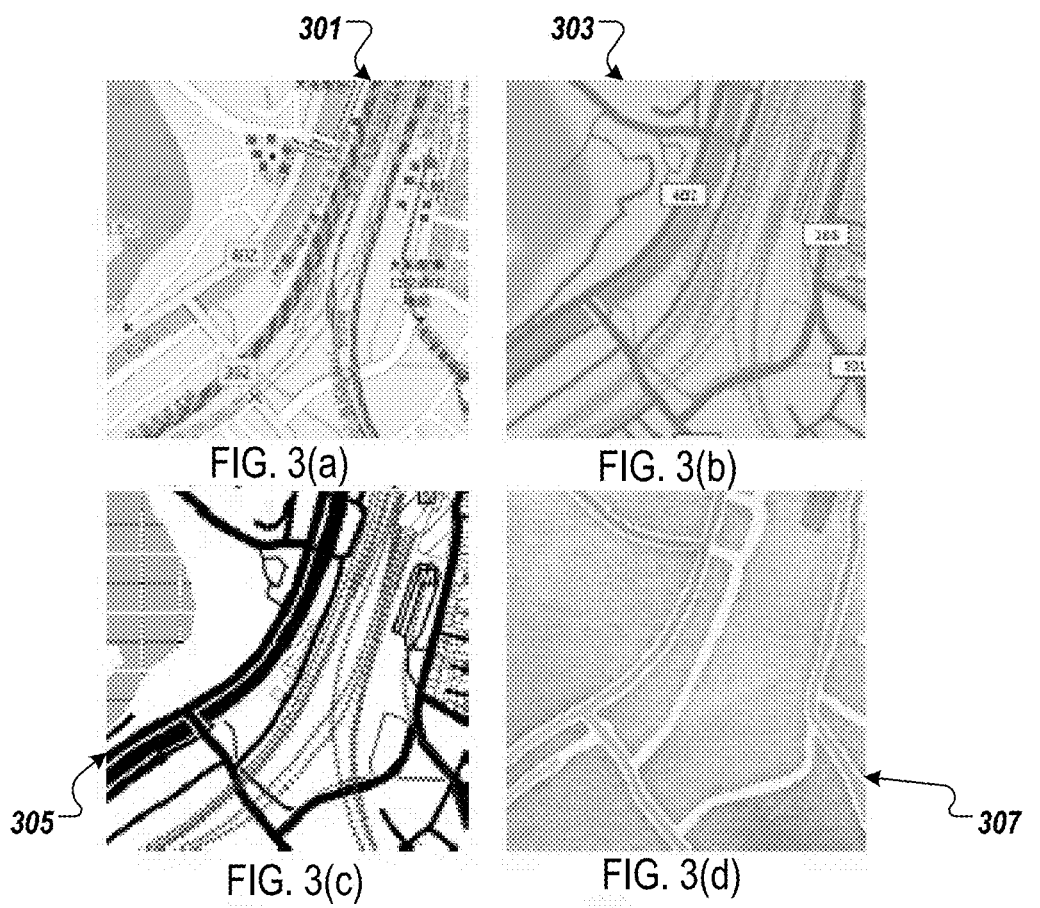
FIGS. 3(a)-3(d) illustrate examples of map tiles in different rendering styles in a training dataset according to an example implementation.

For example, FIGS. 3(a)-3(d) illustrate examples of map tiles in different rendering styles in the training data set. More specifically, FIG. 3(a) illustrates an OpenStreetMap rendering 301, FIG. 3(b) illustrates a terrain rendering 303, FIG. 3(c) illustrates a toner rendering 305, and FIG. 3(d) illustrates a water color rendering 307. According to the example implementations, regardless of the different rendering styles, which are unrelated to the actual location being depicted, the representation and similarity analysis is directed to location based similarity, and is invariant to the different rendering styles. The renderings may be further downsample to 64×64 pixels, and converted to grayscale.

Figure 4:
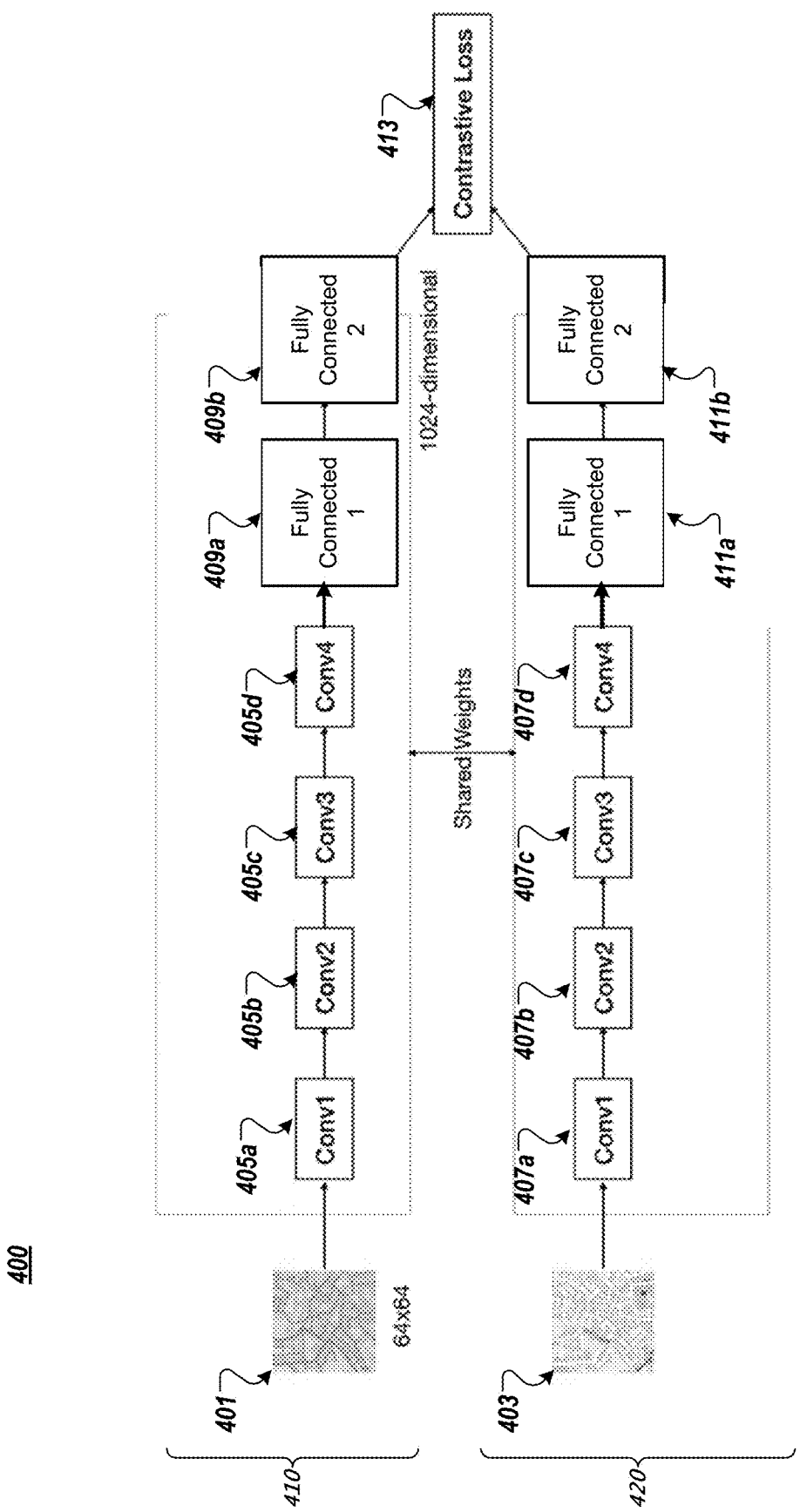
FIG. 4 illustrates a siamese network architecture used to learn location-based map image similarity according to an example implementation.

The resulting output of 205 is provided as an input into the siamese network, which is described in FIG. 4. More specifically, the network 400 consists of twin subnetworks 410 and 420. Each of the subnetworks 410, 420 includes a plurality of fully convolutional layers 405a-405d and 407a-407d, respectively. In the present example implementation for fully convolutional layers are provided. However, the number of fully convolutional layers may be varied, as would be understood by those skilled in the art.

Each of the layers 405a-405d and 407a-407d includes a convolution, followed by a max—pooling and a ReLU activation. The output of the final convolutional layer in each subnetwork is then flattened, and fed through one or more fully connected layers. In the present example implementation to 1024-dimensional fully connected layers 409a, 409b and 411a, 411b are provided. In this example implementation, the first layer 409a, 411a has ReLU activation, and the second layer 409b, 411b has sigmoid activation. The outputs from the final layers 409b, 411b of both subnetworks 410, 420 are then compared, using, for example, contrastive loss 413. Based on this comparison, the weights on both networks are updated identically.

As noted above, the subnetworks 410, 420 have the same number of shared weights, convolutions, connected layers, and the like. Thus, the inputs 401, 403 are compared to each other, and the database is built containing the map information. If the images are similar, the finer layer 409b, 411b rewards similarity and penalizes dissimilarity.

Accordingly, pairs of "similar" images are defined, by randomly selecting a set of map tile locations. For each location, a random selection may be performed to obtain two of the available rendering styles, and feed those two examples as positive training examples into the network. Further, an equal number of "dissimilar" images are randomly selected from the collection for each batch, by randomly selecting two distinct image tile locations, and then randomly selecting one rendering style for each of the locations, and feeding those images in as negative training examples.

Once the model is trained, the entire database of images is fed through one of the twin subnetworks, and the outputs at the final layer are retained as a feature space representation for each image. At query time, new and for unseen images may also be fed through the network, to extract their feature representations, and may be used for querying similar images.

As explained above, at 211, a nearest neighbor search is conducted. This search may be conducted rapidly and at a very large scale, such as using LOPQ, to index high dimensional vectors into coarse sub spaces; as explained above the search may be accelerated by use of coarse geographic information (e.g., city-level recent geographic information). Accordingly, an approximate nearest neighbor search is provided, which operates on the scale of billions of items on a single machine with fast response times. More specifically, all of the images in the database are placed into an LOPQ index.

For an incoming query image, LOPQ is used to find a prescribed number of nearest matches, such as the 1000 nearest matches. LOPQ provides an approximate ranking of the nearest neighbors. Accordingly, the feature vectors are retrieved for each of the prescribed, e.g. 1000, return images of the nearest neighbors, and the images are reordered based on the true distance. The GPS coordinates of the nearest image after reordering are then returned, as the suggested GPS coordinates for the query image. Based on this input, the map tile may be determined.

The example implementations may have various benefits and advantages. For example, the example implementations may apply content based image retrieval to non-photorealistic geographically oriented images, such as maps, to augment the encountered map with geographic metadata extracted from a database of map images. In contrast, the related art has focused on enriching images with additional metadata for conducting content based image retrieval and other metadata associated with images found in large collections, or to localize landmark images.

The related art approaches have mined large socially contributed media collections to identify and localize landmarks, based on aggregate Geo to the behavior of users on social media sites, and modeling the visual appearance of such landmarks based on common viewpoints found in community contributed collections. However, the example implementations are directed to graphic representations such as maps and other visualizations, rather than photographic images of locations, as is done in the related art.

While the foregoing example implementation is directed to and image of a physical map captured by a camera, the present inventive concept is not limited thereto. For example, but not by way of limitation, the forgoing approach may be adopted, such as on a frame by frame basis, or on a video basis, to perform location and inferences from map images in a video, for example.

Additionally, while the example implementation is demonstrated in the context of a map application in a mobile device, the implementation into which the inventive concept may be employed is not limited thereto. For example, but not by way of limitation, the input information may come from a brochure or guidebook, instead of a physical map in a physical location. Further, one or more of a plurality of languages may be employed individually or mixed in the model. Also, the output may be directed not only to a map application, but may be integrated into other applications, such as restaurant application, hotel application, tourism or travel application or any other online application that may be used in conjunction with a navigation function.

According to a method based on the example implementation, the following operations may be performed. A user may capture an image of a physical map, and the example implementation may extract a map from the image. Further, the example implementation may add other features, such as a pin drop to the image of the physical map. Using the CNN and the neural network, as well as the nearest neighbor algorithm, the closest existing map tile in the database may be provided. The user may be provided with an opportunity to vote or otherwise provide input on whether that provided closest existing map tile is a match. Further, calculations may be performed on the information in the training data, and the candidates may be displayed in a device native navigation tool. Further, the tile from the database may be provided as a transparent or semitransparent overlay on the physical map.

Figure 5:
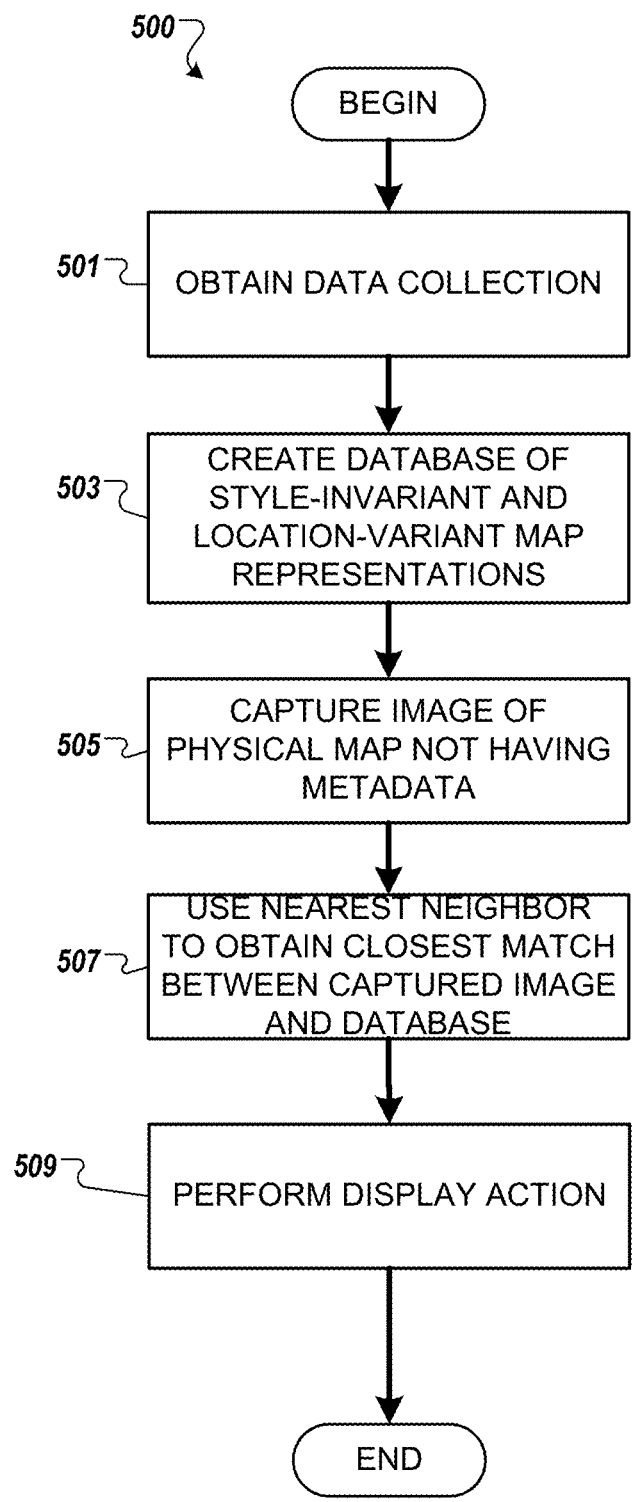
FIG. 5 illustrates a method in accordance with the example implementations.

FIG. 5 illustrates an example process 500 according to the example implementations. At 501, a data collection is obtained. As explained above the data collection may be obtained from one or more sources, having one or more formats. Operations may be performed on the obtained data to standardize different formats of rendering, or convert the formats for further downstream processing.

At 503, a database is generated that includes map representations, such as map tiles, that are invariant with respect to rendering, color, etc., while maintaining variance based on geolocation. Further, the deep siamese convolutional neural network is used to train a model, and enter the entire database of images.

At 505, a captured image of a physical map that does not have metadata is provided. For example but not by way of limitation, the captured image may be captured by a user taking a photo of a map in a train station, as explained above, or the like.

At 507, a search is performed to compare the captured image of 505 with the database of 503. For example, a nearest neighbor algorithm may be employed to determine a closest match between the database and the captured image.

At 509, a result of the search and the captured image are provided in a display action. For example but not by way of limitation, the results of the search may be provided as an overlay on the captured image.

Figure 6:
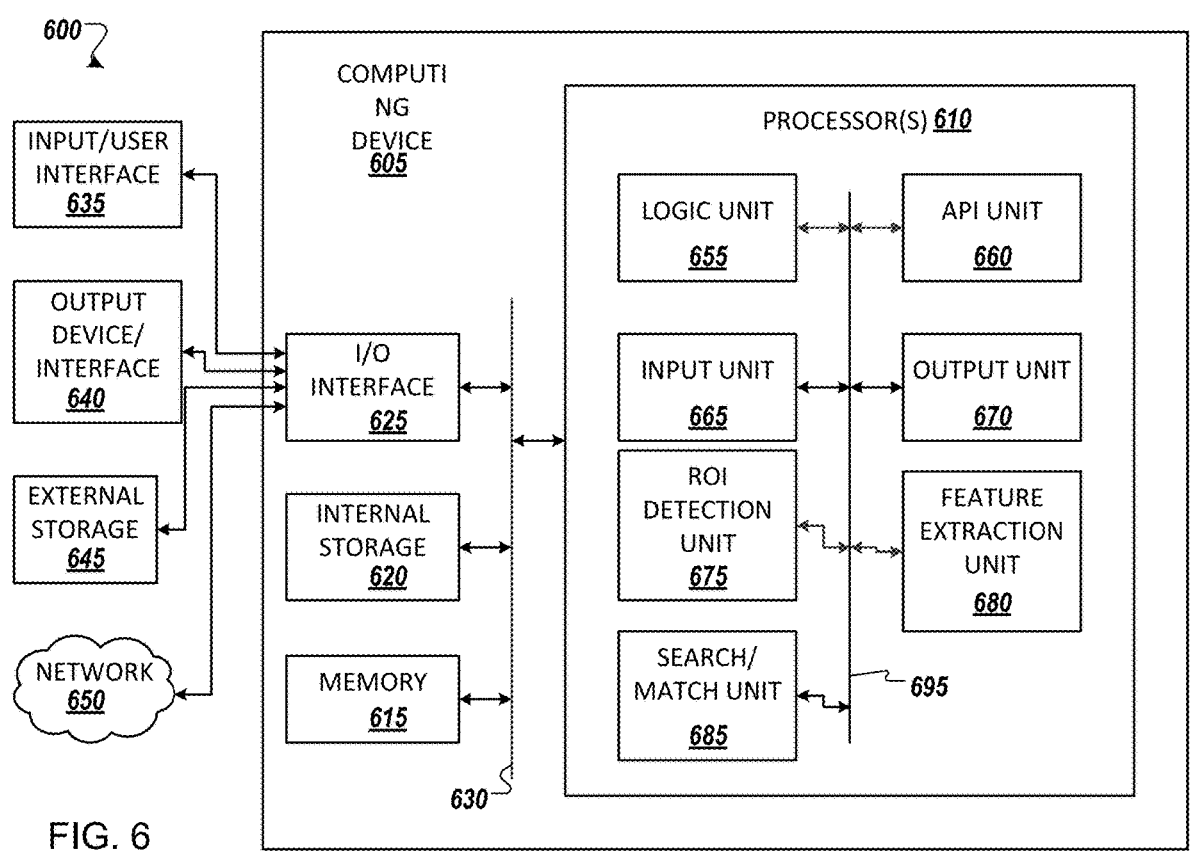
FIG. 6 illustrates an example computing environment with an example computer device suitable for use in some example implementations.

FIG. 6 illustrates an example computing environment 600 with an example computer device 605 suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

Computing device 605 can be communicatively coupled to input/interface 635 and output device/interface 640. Either one or both of input/interface 635 and output device/interface 640 can be a wired or wireless interface and can be detachable. Input/interface 635 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 640 may include a display, television, monitor, printer, speaker, braille, or the like. In some example implementations, input/interface 635 (e.g., user interface) and output device/interface 640 can be embedded with, or physically coupled to, the computing device 605. In other example implementations, other computing devices may function as, or provide the functions of, an input/interface 635 and output device/interface 640 for a computing device 605. These elements may include, but are not limited to, well-known AR hardware inputs so as to permit a user to interact with an AR environment.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as, a server, client, thin server, general machine, special-purpose machine, or another label.

I/O interface 625 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 610 can execute under any operating system (OS) (not shown), in a native or virtual environment. One or more applications can be deployed that include logic unit 655, application programming interface (API) unit 660, input unit 665, output unit 670, ROI detection unit 675, feature extraction unit 680, search/match unit 685, and inter-unit communication mechanism 695 for the different units to communicate with each other, with the OS, and with other applications (not shown).

For example, the ROI detection unit 675, the feature extraction unit 680, and the search/match unit 685 may implement one or more processes shown in FIGS. 2, 4 and 5. The described units and elements can be varied in design, function, configuration, or implementation and are not limited to the descriptions provided.

In some example implementations, when information or an execution instruction is received by API unit 660, it may be communicated to one or more other units (e.g., logic unit 655, input unit 665, ROI detection unit 675, feature extraction unit 680, and search/match unit 685). For example, the ROI detection unit 675 may identify inputs from cameras associated with the physical map, and determine a region of interest. The feature extraction unit 680 may perform feature extraction using the deep Siamese CNN. Additionally, the search/match unit 685 may perform a search to determine a best match between the physical map image and the database, and provide an output.

In some instances, the logic unit 655 may be configured to control the information flow among the units and direct the services provided by API unit 660, input unit 665, ROI detection unit 675, feature extraction unit 680, and search/ match unit 685 in some example implementations described above. For example, the flow of one or more processes or implementations may be controlled by logic unit 655 alone or in conjunction with API unit 660.

Figure 7:
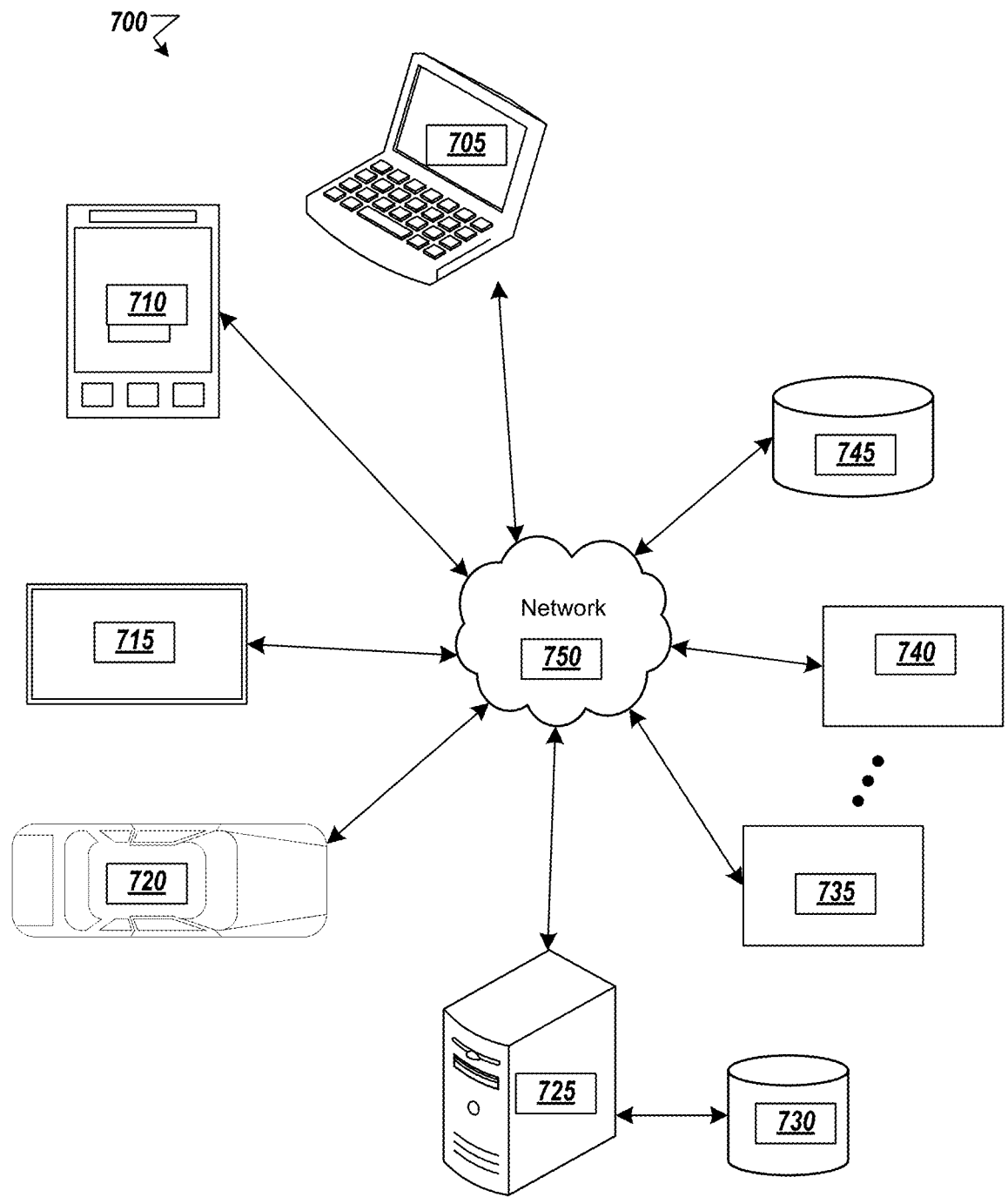
FIG. 7 shows an example environment suitable for some example implementations.

FIG. 7 shows an example environment suitable for some example implementations. Environment 700 includes devices 705-745, and each is communicatively connected to at least one other device via, for example, network 760 (e.g., by wired and/or wireless connections). Some devices may be communicatively connected to one or more storage devices 730 and 745.

An example of one or more devices 705-745 may be computing devices 605 described in FIG. 6, respectively. Devices 705-745 may include, but are not limited to, a computer 705 (e.g., a laptop computing device) having a monitor and an associated webcam as explained above, a mobile device 710 (e.g., smartphone or tablet), a television 715, a device associated with a vehicle 720, a server computer 725, computing devices 735-740, storage devices 730 and 745. The devices may be communicatively connected, including but not limited to AR peripherals that are well known in the art to permit a user to interact in AR, VR, mixed reality, or other environments. Further, the devices may include media object capture hardware, as would be understood by those skilled in the art.

In some implementations, devices 705-720 may be considered user devices associated with the users of the enterprise. Devices 725-745 may be devices associated with service providers (e.g., used by the external host to provide services as described above and with respect to the various drawings, and/or store data, such as webpages, text, text portions, images, image portions, audios, audio segments, videos, video segments, and/or information thereabout).

As explained above, the example implementations are directed to an online mobile application that captures an image of a physical map, and using that captured image, provides a signal that is transmitted to a server remote from the mobile computing device. The server then matches the captured image with the closest online information from a large database that is trained using artificial intelligence techniques, and provides that closest match back to the mobile application. In an example implementation, there may be an overlay between the captured image and the may be provided to the mobile application. However, the example implementations are not limited thereto and other implementations may be substituted therefore without departing from the inventive scope. For example, but not by way of limitation, the captured image is may be provided from satellite images. For example, but not by way of limitation, the maps may also be aerial photographs taken from aircraft, topological maps, or other maps as would be understood by those skilled in the art, and do not have metadata.

Further, the degree of confidence may be adjusted so that the application is provided in a game like manner, so that only some, but not all, of the information may be shown on the display to the mobile device. In one example implementation only certain attributes may be shown, so that the user may use the application as a tutorial to learn about orientation and navigation skills. In yet another example implementation, the captured image may be searching for certain image sensors or other indicia associated with a navigational route. For example but not by way of limitation, for people who have difficulty with eyesight, areas on a sidewalk that are of a different color may be treated with special instructions from a rule engine when displayed in the mobile device. Such an approach could provide the user with a more accurate path to travel, which may also be safer.

Additionally, a determination as to the invariant attributes may be adjusted depending on the application of the example implementation. For example, in example implementations for navigation functions, different views may be presented for an online application associated with motor vehicle routes, bicycle routes, and walking routes.

In addition to the online mobile application, other visual display approaches may be implemented. For example, but not by way of limitation, in an augmented reality approach, a user may be in the augmented reality space associated with a city to be visited, walking around, and then the user receives a brochure or in a language that they do not read. For example, the brochure may be indicative of a restaurant that the user wishes to visit. The user may take a picture of the brochure, and the example implementation may drop a pin augmented reality onto the map that provide the user with an indication of where they are, based on their GPS. Thus, the user can look into the augmented reality system, and obtain information on where to navigate in the city.

According to another example implementation, the physical maps may be provided at kiosks. For example, the map may be in a language that the user cannot understand. In the example implementation, the physical map that is in the language that the user cannot understand may be provided with an overlay from the large database that is in a language that the user can understand. Thus, a user may be able to more easily find landmarks or other points of interest, and avoid a related art problem that occurs when the local kiosk only provides the map in the local language with the desired information, and the native map application does not provide closest match to the map in the kiosk, and omits important information that is present in the map of the kiosk. By using the example implementation to find the closest map from the large database that matches the physical map on the kiosk, the user may be provided with additional information that is indicative of not only the landmarks, but is also indicative of subjective comments that may assist the user in navigation, or other activities such as sightseeing. Further, the application may be integrated into other online applications, such as a calendar, email, social networking service or other online application as would be understood by those skilled in the art.

According to still another example implementation, the physical environment map may not be limited to a geographical or GPS-based approach, and may include other approaches at other scales without departing from the inventive scope. For example but not by way of limitation, in an implementation where an image is provided in a textbook, and a camera is present in a physical environment associated with the image in the textbook, the present example implementation may provide the user with assistance in completing a task. In one example implementation, a medical textbook may provide an image of a target tissue or the like, and a camera such as inside the human body, may actually image the tissue. A closest match may be provided in order to provide an assessment as to a condition of the physical tissue being imaged by the camera inside the body. Further, virtual-reality and/or augmented reality may also be provided in an integrated manner to aid the user in assessing the target tissue condition, and optionally, providing treatment options.

In another example implementation, a camera may be provided on board an aerial aircraft, drone or the like. The physical image that is captured by aerial camera may be compared to a large database for a match. Based on the information that is obtained and the closest map, and assessment may be made as to the image being captured. Such an application may be used in fields such as agriculture or resource management associated with agricultural activities, search and rescue, security, or other fields.

Further, the forgoing example implementations may be modified to provide the user with the ability to establish preferences, either in settings or dynamically. For example, a user that is interested in travel by motorized vehicle may be able to set a preference for maps that show roads. A user that is interested in travel by bicycle or on foot may set a preference for maps that show bicycle trails or walking paths, respectively. Such subjective preferences may be built into the foregoing model.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer implemented method of associating a non-electronic map with an electronic map, the method comprising:
    for an obtained online data collection, generating a database of style-invariant and location-variant map representations by application of a convolutional neural network;
    receiving a captured image of the non-electronic map, the captured image not having geo-location metadata related to the non-electronic map;
    for the captured image, applying a nearest neighbor heuristic to compare the captured image to the map representations and generate a match between the captured image and the map representations; and
    performing a display action associated with the match,
    wherein the convolutional neural network comprises a deep siamese convolutional neural network with a plurality of subnetworks each having identical convolutions and weights, an output of the final layer of each of the subnetworks is subject to contrastive loss comparison, and the weights are updated based on a result of the contrastive loss comparison, and wherein each of the subnetworks receives respective ones of the map representations as inputs, and comprises a plurality of successive convolutional layers in sequence, followed by one or more fully connected layers that provide outputs to the contrastive loss comparison.

2. The computer implemented method of claim 1, wherein the display action comprises providing an overlay of the match of the map representations and the captured image.

3. The computer implemented method of claim 1, further comprising, prior to the applying, integrating coarse geographical information, wherein the coarse geographical information comprises recent geographical information at a city level.

4. The computer implemented method of claim 1, wherein the nearest neighbor heuristic comprises, for the captured image as a query, applying the nearest neighbor heuristic to the database indexed by locally optimized product quantization (LOPQ), to obtain a prescribed number of nearest matches, reorder the nearest matches based on true distance, and provide suggested GPS coordinates for the image.

5. The computer implemented method of claim 1, wherein the style-invariant map representations comprise at least one of color choice and rendering style, and the location-variant representation is associated with a GPS coordinate.

6. The computer implemented method of claim 1, wherein the non-electronic map and/or the electronic map comprises one or more images from a video.

7. A non-transitory computer readable medium including a processor configured to execute instructions stored in a storage, the instructions comprising:
    for an obtained online data collection, generating a database of style-invariant and location-variant map representations by application of a convolutional neural network;
    receiving a captured image of a non-electronic map, the captured image not having geo-location metadata related to the non-electronic map;
    for the captured image, applying a nearest neighbor heuristic to compare the captured image to the map representations and generate a match between the captured image and the map representations; and performing a display action associated with the match, wherein the convolutional neural network comprises a deep siamese convolutional neural network with a plurality of subnetworks each having identical convolutions and weights, an output of the final layer of each of the subnetworks is subject to contrastive loss comparison, and the weights are updated based on a result of the contrastive loss comparison, and wherein each of the subnetworks receives respective ones of the map representations as inputs, and comprises a plurality of successive convolutional layers in sequence, followed by one or more fully connected layers that provide outputs to the contrastive loss comparison.

8. The non-transitory computer readable medium of claim 7, wherein the display action comprises providing an overlay of the match of the map representations and the captured image.

9. The non-transitory computer readable medium of claim 7, further comprising, prior to the applying, integrating coarse geographical information, wherein the coarse geographical information comprises recent geographical information at a city level.

10. The non-transitory computer readable medium of claim 7, wherein the nearest neighbor heuristic comprises, for the captured image as a query, applying the nearest neighbor heuristic to the database indexed by locally optimized product quantization (LOPQ), to obtain a prescribed number of nearest matches, reorder the nearest matches based on true distance, and provide suggested GPS coordinates for the image.

11. The non-transitory computer readable medium of claim 7, wherein the style-invariant map representations comprise at least one of color choice and rendering style, and the location-variant representation is associated with a GPS coordinate.

12. The non-transitory computer readable medium of claim 7, wherein the non-electronic map and/or the electronic map comprises one or more images from a video.

13. An image capture device configured to capture one or more images, and generate media objects, the image capture device including a processor and storage, the processor performing:

capturing an image of a non-electronic map, the captured image not having geo-location metadata related to the non-electronic map, and providing the captured image for:

applying a nearest neighbor heuristic to compare the captured image to, for an obtained online data collection, a database of style-invariant and location-variant map representations obtained by application of a convolutional neural network, to generate a match between the captured image and the map representations;

receiving instructions for performing a display action associated with the match, wherein the convolutional neural network comprises a deep siamese convolutional neural network with a plurality of subnetworks each having identical convolutions and weights, an output of the final layer of each of the subnetworks is subject to contrastive loss comparison, and the weights are updated based on a result of the contrastive loss comparison, wherein each of the subnetworks receives respective ones of the map representations as inputs, and comprises a plurality of successive convolutional layers in sequence, followed by one or more fully connected layers that provide outputs to the contrastive loss comparison, and prior to the applying, coarse geographical information is integrated to narrow the obtained online data collection, wherein the coarse geographical information comprises recent geographical information at a city level.

14. The image capture device of claim 13, wherein the display action comprises providing an overlay of the match of the map representations and the captured image.

15. The image capture device of claim 13, wherein the nearest neighbor heuristic comprises, for the captured image as a query, applying the nearest neighbor heuristic to the database indexed by locally optimized product quantization (LOPQ), to obtain a prescribed number of nearest matches, reorder the nearest matches based on true distance, and provide suggested GPS coordinates for the image.

16. The image capture device of claim 13, wherein the style-invariant map representations comprise at least one of color choice and rendering style, and the location-variant representation is associated with a GPS coordinate.

17. The image capture device of claim 13, wherein the non-electronic map and/or the electronic map comprises one or more images from a video.

* * * * *